US009739690B2

(12) United States Patent
Litz et al.

(10) Patent No.: US 9,739,690 B2
(45) Date of Patent: Aug. 22, 2017

(54) TIRE TESTING APPARATUS

(71) Applicant: MTS Systems Corporation, Eden Prairie, MN (US)

(72) Inventors: Bradley Charles Litz, Chaska, MN (US); Randal Lee Jenniges, Bloomington, MN (US)

(73) Assignee: MTS SYSTEMS CORPORATION, Eden Prairie, MN (US)

( * ) Notice: Subject to any disclaimer, the term of this patent is extended or adjusted under 35 U.S.C. 154(b) by 95 days.

(21) Appl. No.: 14/449,380

(22) Filed: Aug. 1, 2014

(65) Prior Publication Data
US 2015/0033840 A1   Feb. 5, 2015

Related U.S. Application Data

(60) Provisional application No. 61/861,228, filed on Aug. 1, 2013.

(51) Int. Cl.
*G01M 17/02* (2006.01)

(52) U.S. Cl.
CPC ................................ *G01M 17/022* (2013.01)

(58) Field of Classification Search
None
See application file for complete search history.

(56) References Cited

U.S. PATENT DOCUMENTS

| 4,594,878 A * | 6/1986 | Abe ........................ G01N 19/02 73/146 |
| 4,704,900 A * | 11/1987 | Beebe ................. G01M 17/022 73/146 |
| 6,050,876 A | 4/2000 | Ouyang et al. |
| 6,584,835 B2 | 7/2003 | Jenniges et al. |
| 2009/0301183 A1 * | 12/2009 | Jenniges ............. G01M 17/022 73/146 |
| 2010/0031740 A1 | 2/2010 | Olex et al. |
| 2010/0271191 A1 * | 10/2010 | de Graff ............. B60C 23/0493 340/447 |

(Continued)

FOREIGN PATENT DOCUMENTS

| JP | H0720029 A1 | 1/1995 |
| WO | 9908088 A1 | 2/1999 |
| WO | 2012091719 A1 | 7/2012 |

OTHER PUBLICATIONS

International Search Report and Written Opinion from the European Patent Office mailed Oct. 27, 2014 for corresponding International Application No. PCT/US2014/049371, filed Aug. 1, 2014.

*Primary Examiner* — Laura Martin
*Assistant Examiner* — Jean Morello
(74) *Attorney, Agent, or Firm* — Steven M. Koehler; Westman, Champlin & Koehler, P.A

(57) ABSTRACT

A tire testing machine includes a tire and wheel assembly having a sensor configured to measure a parameter related to the tire and wheel assembly as it rotates on a rotating element. A holder supports the tire and wheel assembly. A processor is configured to receive an input at least based on the output signal from the sensor, and provide an output signal indicative of a parameter of a contact patch between a tire of the tire and wheel assembly and the rotating element. Controlled element(s) are configured to vary a parameter related to the contact patch and/or friction.

21 Claims, 5 Drawing Sheets

(56) References Cited

U.S. PATENT DOCUMENTS

2012/0085158 A1* 4/2012 Murakami .......... G01M 17/021
  73/146
2013/0042980 A1* 2/2013 Sotgiu .................. B60C 25/132
  157/1.24
2013/0278406 A1 10/2013 Weston

* cited by examiner

TIRE TESTING APPARATUS

CROSS-REFERENCE TO RELATED APPLICATION

This application claims the benefit of U.S. Provisional patent application Ser. No. 61/861,228 entitled "Tire Testing Apparatus" filed Aug. 1, 2013, the content of which is incorporated herein by reference in its entirety.

BACKGROUND

Laboratory tire test machines are known and are used to conduct tire tread wear tests on tires such as rubber treaded pneumatic or non-pneumatic tires. Generally, a tire and wheel assembly is mounted to a spindle where the tire contacts and rolls against a rotating element such as a drum or the like. The rotating element can have a texture to simulate desired road surfaces. In the alternative or in addition, powder (e.g. talc, silica sand) or other forms of particulate matter can be provided at the tire contact patch. The powder or other particulate matter performs two functions during testing. One function is to provide some control of the friction between the artificial test surface on the rotating element and the tire. The second function is to apply dust to the rubber tread wear particles so they do not stick to the tire or rolling element test surface. The tread wear particles can then be removed by a dust collection system. Various powders and particulates are used. Many are proprietary to the test researchers. Tread wear on the tire is also affected by changes to the test surface as testing progresses. It is often desirable to maintain a surface friction within some range for proper testing. Delivering the proper amount of powder and particulates to the tire contact patch to obtain the desired results is necessary.

On some laboratory tire test machines tire tread wear testing is performed on a curved surface or roller. The curved surface introduces geometry differences in the tire contact patch between testing on the laboratory test machine and real world use of the tire where the contact patch is substantially flat. Adjustments are typically needed to compensate for the test conditions.

The idea of an "intelligent tire" has been advanced. "Intelligent tires" is a term to indicate that the tires have instrumentation or sensor(s) applied to or embedded in the tire to provide feedback to a monitoring system in a vehicle. Work on "intelligent tires" is progressing at tire companies and universities in order that data from the tire is provided to the vehicle monitoring system indicative of roadway friction, tire contact patch size and tire forces. This information can be used during vehicle operation in order to improve vehicle handling and/or stability. The sensor(s) is installed on/in the tire structure or the tire rim to measure, typically, a mechanical change in the tire structure. An algorithm embodied in a computer readable medium that is executed on a processor either within the tire and wheel assembly or outside of the tire and wheel assembly interprets the signal(s) received from the sensor(s). For instance, one method employed by tire companies and universities is to install one or more accelerometers on the inside surface of the tire carcass body or innerliner near the center plane of the tire. The acceleration signal(s) typically is evaluated by the processor executing the algorithm to determine contact patch surface length and characteristics that are indicative of friction between the tire and roadway. It should be noted aspects of the invention described herein do not pertain to algorithms used to evaluate tire friction, but a merely mentioned herein as background information.

SUMMARY

In one embodiment, a tire testing machine includes a rotating element, a tire and wheel assembly having a sensor for measuring a parameter related to the tire and wheel assembly as it rotates on the rotating element and providing an output signal indicative thereof, a holder supporting the tire and wheel assembly for rotation against a surface of the rotating element, a processor configured to receive an input at least based on the output signal from the sensor, the processor configured to provide an output signal indicative of a parameter of a contact patch between a tire of the tire and wheel assembly and the rotating element, and a controlled element configured to vary a parameter related to the contact patch. In one embedment, the parameter may be a length of the contact patch.

The controlled element may include, for example, one or more of a positioner of the holder configured to adjust a position of the tire and wheel assembly relative to the rotating element, a valve configured to adjust a pressure of gas in the tire and wheel assembly, or a material supply system to affect contact of the tire against the rotating element, the material supply system adjusting delivery of material based on an output signal from the processor.

The rotating element may include, for example, a rotating wheel or a rotating endless belt.

In another embodiment, a tire testing machine includes a rotating element, a tire and wheel assembly having a sensor for measuring a parameter related to the tire and wheel assembly as it rotates on the rotating element and providing an output signal indicative thereof, a holder supporting the tire and wheel assembly for rotation against a surface of the rotating element, a processor configured to receive an input at least based on the output signal from the sensor, the processor configured to provide an output signal indicative of a parameter of friction between a tire of the tire and wheel assembly and the rolling element, and a controlled element configured to vary a parameter related to the friction. The controlled element may be, for example, a material supply system to adjust delivery of material to the tire and the rolling element based on an output signal from the processor.

In yet another embodiment, a method of operating a tire testing machine includes measuring a parameter using a sensor of a tire and wheel assembly of the tire testing machine, providing an output signal based on the measured parameter, receiving an input based on the output signal, generating an output signal indicative of a parameter of a contact patch between a tire of the tire and wheel assembly and a surface of a rotating element of the tire testing machine, and varying the parameter related to the contact patch.

Generating an output signal may include, for example, estimating friction at the contact patch. Varying the parameter may include, for example, one or more of adjusting a position of the tire and wheel assembly relative to the rotating element, estimating friction at the contact patch, and wherein varying the parameter comprises adjusting a pressure of gas in the tire of the tire and wheel assembly, or varying the parameter comprises adjusting delivery of material to an area of the contact patch.

The method may also further include one or more of determining when the surface of the rotating element is in need of replacement based on the friction at the contact patch, and determining whether a material delivery system of the tire testing machine is properly functioning based on the friction at the contact patch.

In still another embodiment, a method of operating a tire testing machine includes receiving a signal indicative of a parameter of the tire testing machine from an intelligent tire of the tire testing machine, feeding the signal to a parameter varying system, and adjusting the parameter based on the feedback signal. Adjusting the parameter may include providing feedback from the intelligent tire to the parameter varying system, and varying the parameter by one or more of controlling friction at an area of a contact patch between the intelligent tire and a surface of a rotating element of the tire testing machine, and varying the parameter by controlling air pressure in the intelligent tire.

In one or more embodiments, the parameter may be rendered to a user.

Two or more of the foregoing features can be combined together as desired.

DETAILED DESCRIPTION OF ILLUSTRATIVE EMBODIMENTS

Figure 1:
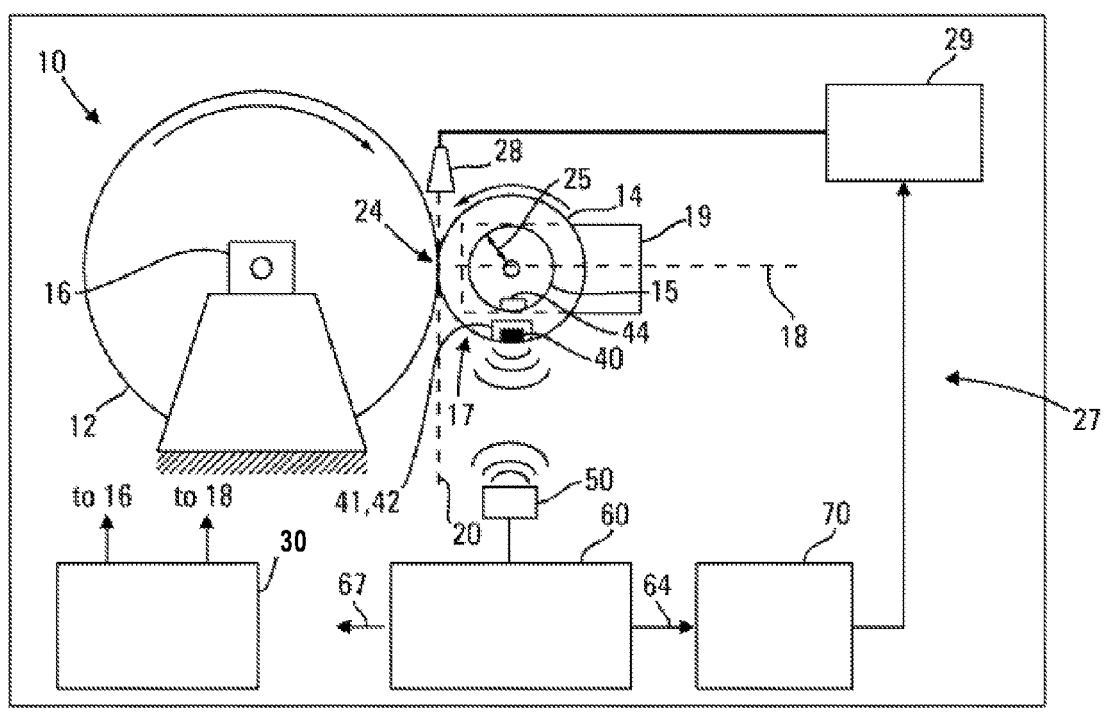
FIG. 1 is a schematic view of a tire testing machine according to an embodiment of the present disclosure.

A tire tread wear test machine is illustrated at 10 in FIG. 1. The test machine 10 includes a rotating element 12 upon which a tire 14 rotates thereon. The rotating element 12 can take numerous forms including a large drum or wheel as illustrated or a flat belt assembly having a rotating endless belt, such as disclosed in U.S. Pat. No. 6,584,835. Such systems are available from MTS Systems Corporation of Eden Prairie, Minn.

The rotating element 12 is driven by a drive motor schematically illustrated at 16 and comprising a hydraulic, pneumatic or electric motor. The tire 14 is mounted to a suitable wheel 15 (tire and wheel assembly 17) that in turn is mounted to a spindle (i.e. holder) of a wheel positioner, schematically illustrated at 19, which positions the tire 14 upon the rotating element 12. The positioner 19 can include various actuators (typically hydraulic, but could also be electric), levers, struts, pivots and the like to adjust the position of the tire and wheel assembly 17 as well as to load (apply a force) the tire 14 upon the rotating element 12. For instance, positioning can include simulated steering position or movement of the tire and wheel assembly 17 about a steering axis 18. Other positioning parameters can also include adjusting the camber of the tire and wheel assembly 17 as it rotates upon the rotating element 12. In the embodiment illustrated, the camber adjustment can be about an axis 20 extending through a tire contact patch 24 of the tire 14 with the rotating element 12. If desired, the positioner can also adjust a caster angle 25 of the steering axis 18 relative to a reference axis, for instance, that is perpendicular to the surface of the rotating element 12 through the tire contact patch. It should be understood that the positioner 19 need not provide any or all of the position adjustments of the tire and wheel assembly 17, but rather the foregoing position adjustments of the tire and wheel assembly are merely illustrative. A system controller 30 provides control signals to control operation of the testing machine 10 such as but not limited to the motor 16 and the positioner 19.

In the embodiment of FIG. 1, a material supply system 27 that provides a powder, fluid or other substance to the rotating element 12, the tire 14 and/or otherwise is positioned so as to provide material to the tire contact patch 24. In the embodiment illustrated, the material is provided through a nozzle 28 coupled to a material feeder 29 (hereinafter exemplified as providing powder). Material supply systems 27 are well known in the art.

One or more sensors 40 are disposed on or in the tire and wheel assembly 17 so as to provide output signal(s) indicative of measured parameter(s). The output signal(s) from the sensor(s) 40 are typically to a transmitter or processing module 41 that can include a transmitter 42, if desired. The processing module 41 can be mounted to the tire 14 along with the sensor(s) 40, or be mounted to the wheel 15, such as indicated at 44. Typically, the transmitter 42 is wirelessly coupled to a receiver 50 as illustrated, although if desired, a wired signal transmission system can couple the sensor(s) 40, processing module 41, and/or transmitter 42 directly to a receiver 50 using a wired connection formed with a slip ring assembly, not shown, but provided on a tire and wheel assembly 17.

The receiver 50 is electrically connected to and provides an input signal to a friction estimation processor 60. The friction estimation processor 60 provides an estimated value or parameter indicative of friction at the contact patch 24, or another parameter of the tire 14 engaging the rotating element 12. In the embodiment illustrated, the friction estimation processor 60 provides an output signal 64 that forms a command signal to a powder delivery controller 70. The powder delivery controller 70 in turn provides a control signal to the powder feeder 29. The sensor(s) 40 in the tire 14, along with the friction estimation processor 60 (and any or all of the foregoing hardware to provide an input to the friction estimating processor 60 based on the output signal from the sensor(s) 40) provides a feedback signal to powder delivery controller 70 that adjusts the feed rate of the powder to the tire contact patch 24. It should be noted aspects of the invention described herein do not pertain to algorithms used by friction estimation processor 60 to evaluate tire friction. For purposes of aspects of the invention, friction estimation processor 60 need only provide an output signal 64 that can be used to control the application of powder by the powder feeder 29. In another embodiment, the friction at the tire contact patch 24 ascertained by friction estimation processor 60 can be used to ascertain when a surface (or elements forming the surface) needs to be replaced as indicated by an output signal 67.

It should be noted that the calculated friction or other parameter of the tire and wheel assembly 17 or at the tire contact patch 24 can also be rendered to a user by any suitable device such as a monitor, printer or electronic file recording device. A desired value of the parameter such as friction at the tire contact patch 24, for example, can be obtained, or maintained within a desired range by the user. Likewise, if desired, the friction at the tire contact patch 24 can be adjusted using the powder feeder 29 as controlled by the powder delivery controller 70 and associated equipment described above throughout or during a test, thereby, providing the user the ability to create more complicated and/or real world tire tests.

In addition, or in the alternative to adjusting the friction of the tire 14 upon the rotating element 12 at the tire contact patch 24, the test machine 10 can measure a length of the tire contact patch 24. With measurement of the length of the tire contact patch 24, one or more parameters of the test machine 10 such as any one or more of the parameters of the positioner 19 can be adjusted in order to obtain a desired length of the tire contact patch 24.

Figure 2:
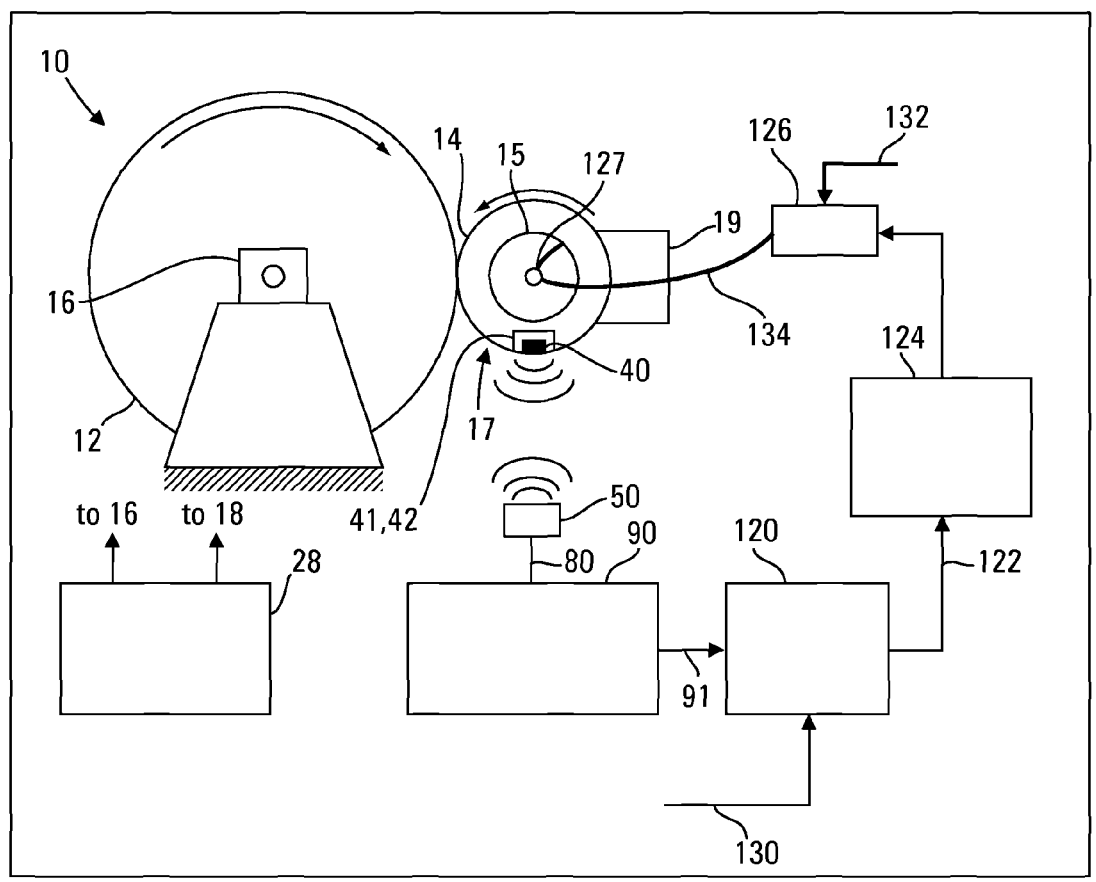
FIG. 2 is a schematic view of a tire testing machine according to another embodiment of the present disclosure.

FIG. 2 schematically illustrates another technique for adjusting a length of the tire contact patch 24 that can be used by itself or in conjunction with adjusting one or more of the parameters of the positioner 19. In particular, adjustment of the length of the tire contact patch 24 in FIG. 2 is obtained by adjusting or regulating the gas pressure in the tire and wheel assembly 17. By measuring the length of the tire contact patch 24, the gas pressure can be adjusted (and/or other parameters of the test machine can be adjusted) so as to obtain the desired length of the tire contact patch 24. Adjustment of the length of the tire contact patch 24 is particularly advantageous when the test machine 10 includes a round drum, wheel or the like that provides a curved surface upon which the tire 14 rotates. Using the sensor(s) 40, processing module 41, transmitter 42 and/or receiver 50, an input signal 80 is provided to a tire contact patch length calculation processor 90 that calculates the length of the tire contact patch 24, which is provided as an output signal 91.

Figure 3:
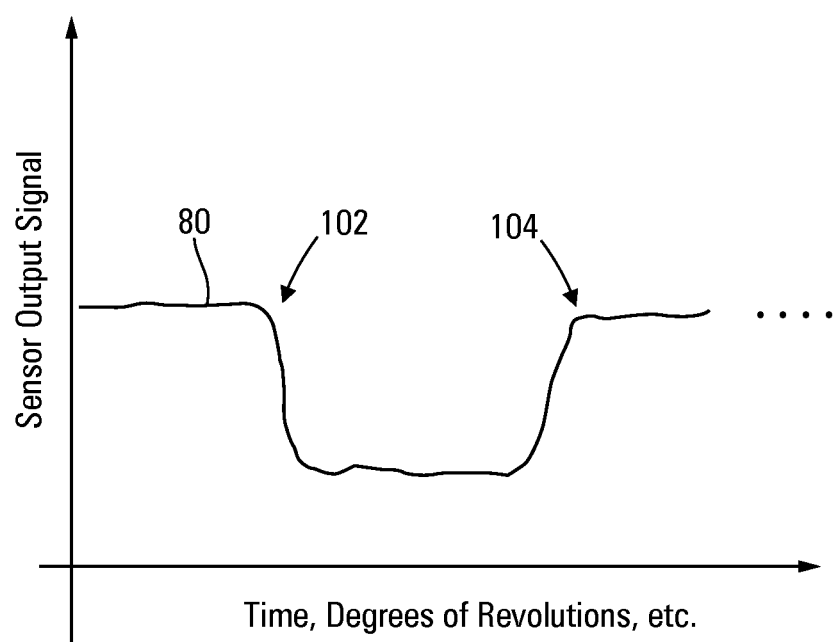
FIG. 3 is a graph of accelerometer output of an accelerometer according to an embodiment of the present disclosure.

Referring to FIG. 3, in one illustrative embodiment, the sensor(s) 40 can each comprise an accelerometer that provides an output signal that varies over one revolution of the tire 14. In particular, the accelerometer can provide a signal indicated at 80 that is substantially constant during rotation of the tire 14 but for at the tire contact patch 24. As illustrated in FIG. 3, when the tire 14 contacts the surface of the rolling element 12 at the beginning of the tire contact patch 24, the accelerometer senses this contact as indicated at 102 in FIG. 3. Another change in the output signal from the accelerometer is indicated at 104, which corresponds to the end of the tire contact patch 24 or where the portion of the tire 14 having the sensor 40 leaves or disengages from the surface of the rotating element 12. By measuring the time between the changes in the output signal between points 102 and 104, or measuring the angle of the rotation of the tire and wheel assembly 17 between these points, or using other suitable processing techniques that can include other parameters of the tire and wheel assembly 17 or test machine 10 as needed, such as but not limited to the rotational speed of the tire and wheel assembly 17, a value indicative of the length of the tire contact patch 24 is outputted from the tire contact patch length calculation processor 90 as signal 91 and provided to a tire contact patch length regulator 120. The tire contact patch length regulator 120 compares the output receipt from the tire contact patch length calculation processor 90 with a signal 130 indicative of the desired length of the tire contact patch 24 and provides, in the embodiment illustrated, an output signal 122 to a tire inflation pressure controller 124 that in turn controls a valve 126 connected to an air supply 132 in order to increase or decrease the gas pressure in the tire and wheel assembly 17 via air hose 134. In the embodiment illustrated, the valve 126 and hose 134 are operably coupled through a rotary union 127 to the tire and wheel assembly 17 so as to allow the gas pressure to be adjusted as the tire and wheel assembly 17 rotates. It should be noted in another embodiment, if desired, the calculated value of the length of the tire contact patch 24 as calculated by the tire contact patch length calculation processor 90 can be rendered to a user though a suitable rendering device such as a monitor or a printer. The user can then adjust the gas pressure of the tire and wheel assembly 17 manually using a manually operated control valve with or without the rotary union 127.

For example, three axis accelerometers may be employed. Multiple accelerometers may be placed across the width of the tire carcass. Multiple sensors could be installed around the circumference of the tire to increase the rate that tire information is provided from the tire. A single sensor provides information once per tire revolution whereas two sensors provide information twice per revolution and so on.

Figure 4:
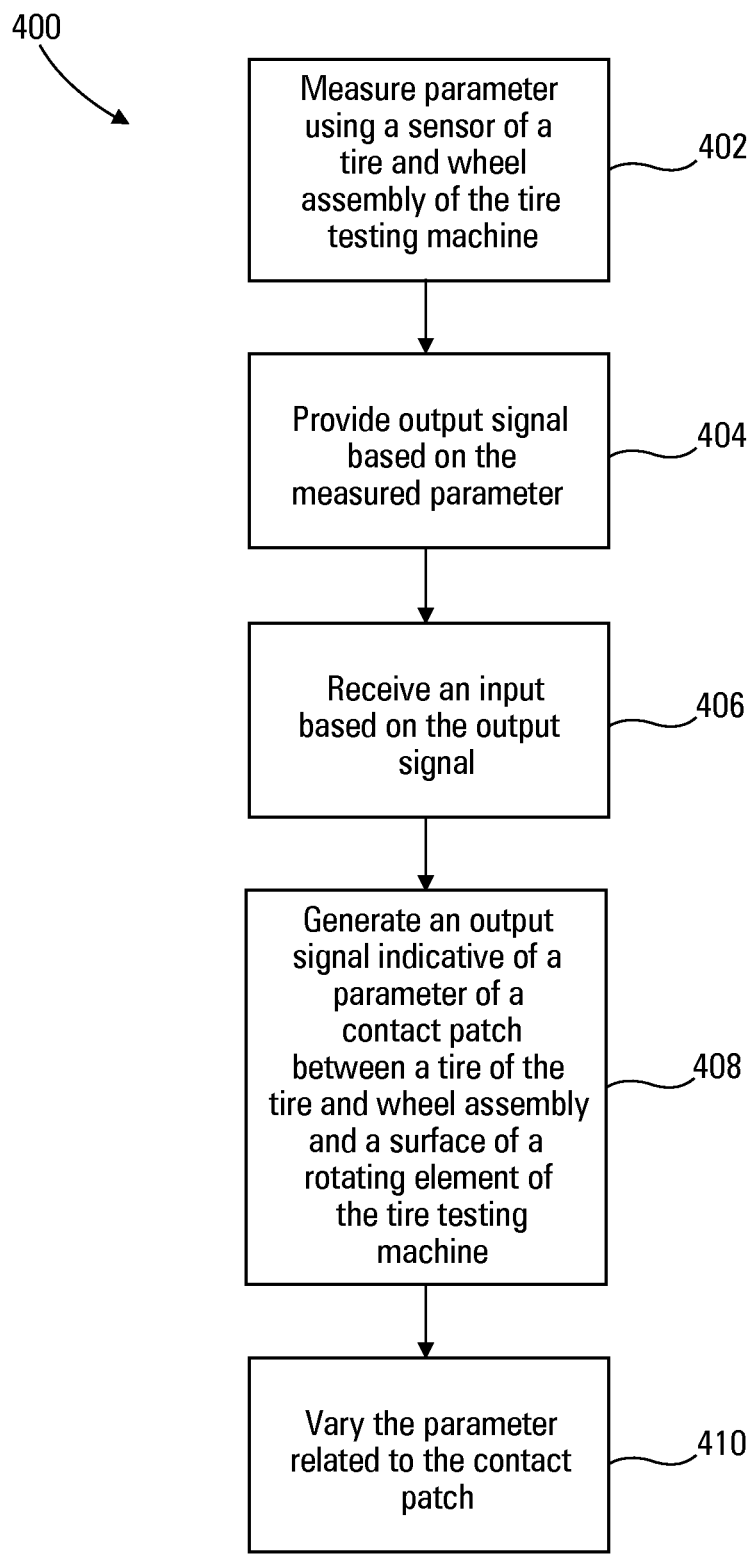
FIG. 4 is a flow chart of a method according to an embodiment of the present disclosure.

FIG. 4 is a flow chart diagram of a method 400 of operating a tire testing machine. Method 400 comprises, in one embodiment, measuring a parameter using a sensor of a tire and wheel assembly of the tire testing machine in block 402, providing an output signal based on the measured parameter in block 404, receiving an input based on the output signal in block 406, generating an output signal indicative of a parameter of a contact patch between a tire of the tire and wheel assembly and a surface of a rotating element of the tire testing machine in block 408, and varying the parameter related to the contact patch in block 410.

Figure 5:
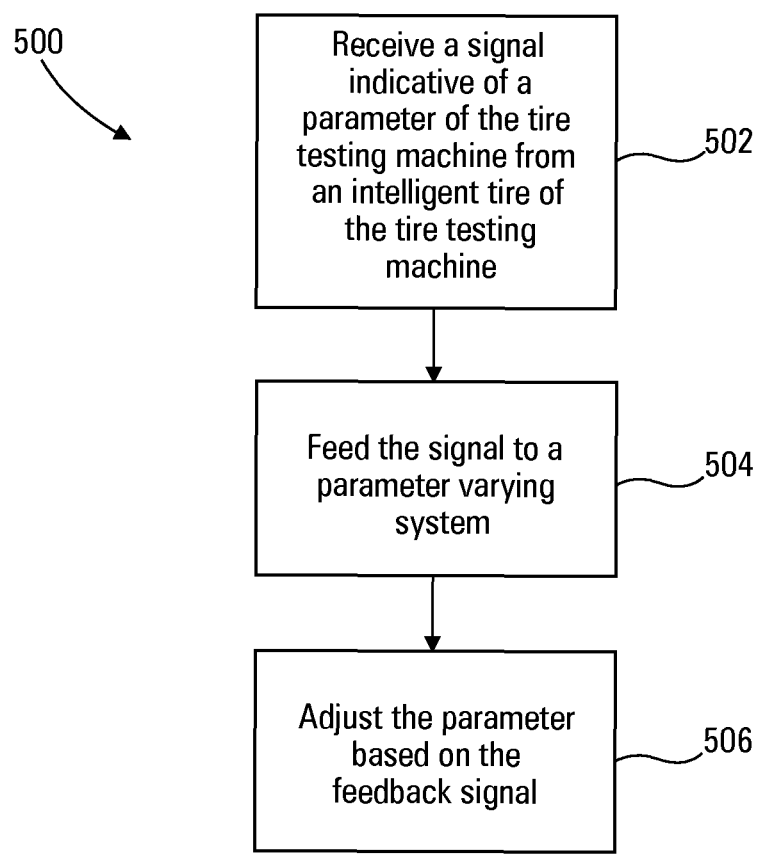
FIG. 5 is a flow chart diagram of a method according to another embodiment of the present disclosure.

FIG. 5 is a flow chart diagram of another method 500 of operating a tire testing machine. Method 500 comprises, in one embodiment, receiving a signal indicative of a parameter of the tire testing machine from an intelligent tire of the tire testing machine in block 502, feeding the signal to a parameter varying system in block 504, and adjusting the parameter based on the feedback signal in block 506.

It should also be understood that in the embodiments provided above if desired a plurality of sensors 40 can be disposed along the width of the tire 14 to measure the length of the tire contact patch 24 at selected locations along the width of the tire 14.

Each of the processing modules, controllers and regulators indicated above can be implemented with analog and/or digital circuitry. It should also be noted that although separate processing modules, controllers and regulators have been illustrated, this should not be considered limiting wherein this was done in order to provide more clarity for understanding aspects of the invention. Practical embodiments of the tire testing machine 10 may include a single or multiple analog and/or digital circuits to perform one or more of the foregoing processing steps or implement one or more of the controllers, processors and regulators. In addition, it should be understood that the processing steps, or portions thereof, can be performed with hardware and/or software in any combination or portion thereof. The software comprises instructions executed by any suitable processor. The processor can be implemented with an electrical circuit having, for instance, a microprocessor and support peripherals such as random access memory (RAM), read only memory (ROM) and/or other computer readable, non-transitory storage mediums communicating with each other over a system bus. A circuit board can be used to form the electrical connections for each of the foregoing components and/or one or more components can be implemented as a system-on-a-chip. Other components such as analog-to-digital converters, digital-to-analog converters, monitors and user operated input devices (keyboards, pointers, etc.) can also be operably coupled to one or more of the foregoing components such as through the system bus.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

What is claimed is:

1. A tire testing machine comprising:
   a rotating element;
   a tire and wheel assembly having a sensor with a transmitter that rotates with the tire and wheel assembly about an axis thereof, the sensor configured to:
      sense a parameter occurring at a contact patch between a tire of the tire and wheel assembly and the rotating element; and
      transmit wirelessly, via the transmitter, an output signal indicative thereof;
   a holder supporting the tire and wheel assembly for rotation against a surface of the rotating element;
   a receiver, configured to receive the output signal from the transmitter;
   a processor configured to:
      receive an input signal from the receiver based on the output signal from the transmitter; and
      ascertain an output signal indicative of the parameter occurring at a contact patch between the tire of the tire and wheel assembly and the rotating element at least based on the input signal received at the processor; and
   a controlled element configured to receive the output signal from the processor and control inflation of the tire and wheel assembly or a position of the tire and wheel assembly on the rotating element according to the output signal from the processor.

2. The tire testing machine of claim 1 wherein the controlled element comprises a positioner of the holder configured to control a position of the tire and wheel assembly relative to the rotating element.

3. The tire testing machine of claim 1 wherein the controlled element comprises a valve configured to control a pressure of gas in the tire and wheel assembly.

4. The tire testing machine of claim 1, and further comprising a material supply system operably coupled to the processor, the material supply system operable to affect contact of the tire against the rotating element.

5. The tire testing machine of claim 1, wherein the parameter comprises a length of the contact patch.

6. The tire testing machine of claim 1, wherein the rotating element comprises a rotating wheel.

7. The tire testing machine of claim 1, wherein the rotating element comprises a rotating endless belt.

8. A method of operating a tire testing machine, comprising:
   sensing a parameter using a sensor of a tire and wheel assembly of the tire testing machine;
   providing an output signal based on the sensed parameter;
   receiving an input based on the output signal;
   generating an output signal indicative of a parameter of a contact patch between a tire of the tire and wheel assembly and a surface of a rotating element of the tire testing machine based on the received input; and
   controlling the parameter related to the contact patch based on the generated output signal, wherein controlling the parameter comprises controlling delivery of material to an area of the contact patch.

9. The method of claim 8, and further comprising controlling a position of the tire and wheel assembly relative to the rotating element.

10. The method of claim 8, and further comprising controlling a pressure of gas in the tire of the tire and wheel assembly.

11. The method of claim 8, wherein generating an output signal comprises estimating friction at the contact patch.

12. The method of claim 8, further comprising determining when the surface of the rotating element is in need of replacement based on the parameter of the contact patch between the tire of the tire and wheel assembly and the surface of a rotating element.

13. The method of claim 8, further comprising determining whether a material delivery system of the tire testing machine is properly functioning based on the parameter of the contact patch between the tire of the tire and wheel assembly and the surface of a rotating element.

14. The method of claim 8, and further comprising displaying the parameter.

15. A method of operating a tire testing machine, comprising:
   receiving a feedback signal indicative of a parameter of the tire testing machine from an intelligent tire of the tire testing machine, wherein the parameter is determined from a sensed physical condition occurring at a contact patch between the intelligent tire and a surface of a rotating element of the tire testing machine, and wherein the sensed physical condition is sensed by a sensor of the intelligent tire that rotates with the intelligent tire about an axis thereof;
   feeding the signal to a parameter varying system; and
   controlling the parameter based on the feedback signal, which includes controlling inflation of the intelligent tire or a position of the intelligent tire on the rotating element.

16. The method of claim 15, and further comprising displaying the parameter.

17. A tire testing machine comprising:
   a rotating element;
   a tire and wheel assembly having a sensor with a transmitter that rotates with the tire and wheel assembly about an axis thereof, the sensor configured to:
      sense a portion of the tire of the tire and wheel assembly responding to the rotating element as the portion rotates about the axis; and
      transmit wirelessly, via the transmitter, an output signal indicative of the portion of the tire responding to the rotating element as the portion rotates about the axis;
   a holder supporting the tire and wheel assembly for rotation against a surface of the rotating element;
   a receiver, configured to receive the output signal from the transmitter;
   a processor, communicatively coupled to the receiver, configured to:
      receive an input signal from the receiver based on the output signal from the transmitter; and
      provide a control signal based on the portion of the tire responding to the rotating element as the portion rotates about the axis; and
   a controlled element configured to receive the control signal, the controlled element being controlled to affect the portion of the tire of the tire and wheel assembly as the portion rotates about the axis of the tire and wheel assembly.

18. The tire testing machine of claim 17 wherein the controlled element is a valve that controls inflation of the tire and wheel assembly.

19. The tire testing machine of claim 17 wherein the controlled element is a positioner coupled to the holder to control position of the tire and wheel assembly on the rotating element.

20. The tire testing machine of claim 17, wherein the controlled element is a material supply system configured to control delivery of material to affect contact of the tire against the rotating element based on the control signal.

21. A tire testing machine comprising:
a rotating element;
a tire and wheel assembly having a sensor with a transmitter that rotates with the tire and wheel assembly about an axis thereof, the sensor configured to:
  sense a parameter occurring at a contact patch between a tire of the tire and wheel assembly and the rotating element; and
  transmit wirelessly, via the transmitter, an output signal indicative thereof;
a holder supporting the tire and wheel assembly for rotation against a surface of the rotating element;
a receiver, configured to receive the output signal from the transmitter;
a processor configured to:
  receive an input signal from the receiver based on the output signal from the transmitter; and
  ascertain an output signal indicative of the parameter occurring at a contact patch between the tire of the tire and wheel assembly and the rotating element at least based on the input signal received at the processor; and
a material supply system, operably coupled to the processor, and operable to affect contact of the tire against the rotating element by controlling delivery of material based on the output signal from the processor.

* * * * *